(12) United States Patent
Smith et al.

(10) Patent No.: US 8,221,644 B2
(45) Date of Patent: Jul. 17, 2012

(54) COMPOSITIONS AND METHODS FOR ANTI-ICING/DE-ICING

(75) Inventors: Andrew G. Smith, Spring Grove, PA (US); Charles H. Svec, Hanover, PA (US); Gary C. Wakefield, Slippery Rock, PA (US)

(73) Assignee: Miller Chemical & Fertilizer Corporation, Hanover, PA (US)

( * ) Notice: Subject to any disclaimer, the term of this patent is extended or adjusted under 35 U.S.C. 154(b) by 0 days.

(21) Appl. No.: 13/106,943

(22) Filed: May 13, 2011

(65) Prior Publication Data

US 2012/0018668 A1     Jan. 26, 2012

Related U.S. Application Data

(60) Provisional application No. 61/366,092, filed on Jul. 20, 2010.

(51) Int. Cl.
*C09K 3/18* (2006.01)
(52) U.S. Cl. .................. 252/70; 106/13; 427/385.5
(58) Field of Classification Search .................. 106/13; 252/70; 427/385.5
See application file for complete search history.

(56) References Cited

U.S. PATENT DOCUMENTS

| | | | |
|---|---|---|---|
| 3,489,596 A | 1/1970 | Plump | |
| 4,434,190 A | 2/1984 | Dubois | |
| 5,035,934 A | 7/1991 | Tomiyama | |
| 5,188,750 A * | 2/1993 | Kogure et al. | 252/70 |
| 5,595,679 A | 1/1997 | Zaid | |
| 5,605,591 A | 2/1997 | Beyrle | |
| 5,676,763 A | 10/1997 | Salisbury | |
| 5,773,390 A | 6/1998 | Salisbury | |
| 5,849,356 A * | 12/1998 | Gambino et al. | 427/136 |
| 5,863,973 A * | 1/1999 | Carder et al. | 524/388 |
| 6,372,842 B1 | 4/2002 | Grisso | |
| 6,534,449 B1 | 3/2003 | Gilmour | |
| 6,767,874 B2 | 7/2004 | Gonzalez | |
| 2005/0116197 A1 | 6/2005 | Alger | |
| 2006/0083493 A1 | 4/2006 | Dolton | |
| 2008/0175987 A1 | 7/2008 | Carter | |
| 2009/0309061 A1 | 12/2009 | Seiler | |

FOREIGN PATENT DOCUMENTS

| | | |
|---|---|---|
| JP | 58-118879 A * | 7/1983 |
| JP | 2010-273617 | 10/1998 |
| JP | 2009-035995 | 2/2009 |

OTHER PUBLICATIONS

International Search Report dated Aug. 18, 2011 and issued in corresponding International Patent Application No. PCT/US2011/36441.

* cited by examiner

*Primary Examiner* — Anthony J Green
(74) *Attorney, Agent, or Firm* — Howson & Howson LLP

(57) ABSTRACT

Methods are provided which minimize loss of an anti-icing/de-icing composition from a surface. This is accomplished by adhering the anti-icing/de-icing composition to a surface using a film-forming polymeric composition. Methods are also provided for preventing snow accumulation and/or ice formation on a surface, delaying ice and/or snow formation on a surface, extending the life of an anti-icing/de-icing composition on a surface, surface anti-icing, and surface de-icing. These methods include the application of a film-forming polymeric composition and the anti-icing/de-icing composition to the surface. Desirably, the anti-icing/de-icing composition is a reagent which reduces the freezing point of water.

18 Claims, 4 Drawing Sheets

US 8,221,644 B2

COMPOSITIONS AND METHODS FOR ANTI-ICING/DE-ICING

CROSS-REFERENCE TO RELATED APPLICATIONS

This application claims the benefit of the priority of U.S. Provisional Patent Application No. 61/366,092, filed Jul. 20, 2010, the specification of which is herein incorporated by reference.

BACKGROUND OF THE INVENTION

Winter maintenance on travelled surfaces in both normal ground transportation and aviation frequently involves dispensing anti-icing and de-icing chemicals on surfaces, e.g., asphalt and concrete, to prevent slippery conditions and ice formation during various winter conditions and precipitation. The effectiveness of these anti-icing and de-icing chemicals depends on various parameters, of which many are out of the control of maintenance personnel. These parameters include the type and amount of traffic on the road or runway immediately after the application of the materials, the promptness and accuracy of the forecasted precipitation, and the amount and severity of the actual precipitation, among many others.

Anti-icing and de-icing chemicals are applied to the roads in most cases with full traffic or where heavy traffic can be expected shortly after application, i.e., the aviation industry. Traffic flow on roads and bridges, together with adverse weather conditions, can clear substantial portions of the applied chemicals off the intended surfaces before the desired effect can take place.

In the case of preventive winter maintenance, undesired and different or early/late precipitation can a have similar effect. Specifically, the anti-icing and de-icing chemicals may be washed off the pavement surface or otherwise displaced before they can be effective in developing the desired ice or snow control results.

Another parameter that seriously affects the performance of anti-icing and de-icing chemicals is their ability to remain attached to the pavement or compromised surfaces for the period of time necessary to develop their desired control influence. This ability can be severely impeded by traffic flow, wind, and delayed or different than expected precipitation. Due to these effects, agencies and companies responsible for snow/ice control of travelled surfaces often dispense much more of the anti-icing and de-icing chemicals than necessary. Further, it is often necessary to repeat early applications due to delays or underestimates in predicted precipitations. Similarly, differences in forecasted precipitation and heavy traffic conditions often force agencies responsible for snow/ice control to repeat anti-icing and de-icing applications more than once in severe weather conditions.

There remains a need in the art for alternate and improved compositions and methods for anti-icing and/or de-icing surfaces such as vehicle roadways and runways.

SUMMARY OF THE INVENTION

In one aspect, methods for anti-icing a surface, de-icing a surface, or a combination thereof are provided. The methods include applying an anti-icing/de-icing composition and a film-forming polymeric composition to the surface. In one embodiment, the film-forming polymeric composition adheres the anti-icing/de-icing composition to the surface.

In another aspect, methods for minimizing loss of an anti-icing/de-icing composition from a surface are provided and include applying a film-forming polymeric composition and the anti-icing/de-icing composition to the surface.

In a further aspect, methods for adhering an anti-icing/de-icing composition to a surface are provided and include applying a film-forming polymeric composition and an anti-icing/de-icing composition to the surface.

In still another aspect, methods for preventing snow accumulation or ice formation on a surface are provided and include applying a film-forming polymeric composition and an anti-icing/de-icing composition to the surface.

In yet a further aspect, methods for delaying ice formation on a surface are provided and include applying a film-forming polymeric composition and an anti-icing/de-icing composition to the surface.

In still a further aspect, methods for extending the life of an anti-icing/de-icing composition on a surface are provided and include applying a film-forming polymeric composition and an anti-icing/de-icing composition to the surface.

In yet another aspect, methods for surface anti-icing are provided and include applying a film-forming polymeric composition and an anti-icing/de-icing composition to the surface.

In still another aspect, methods for surface de-icing are provided and include applying a film-forming polymeric composition and an anti-icing/de-icing composition to the surface.

Other aspects and advantages of the invention will be readily apparent from the following detailed description of the invention.

DETAILED DESCRIPTION OF THE INVENTION

Figure 1:
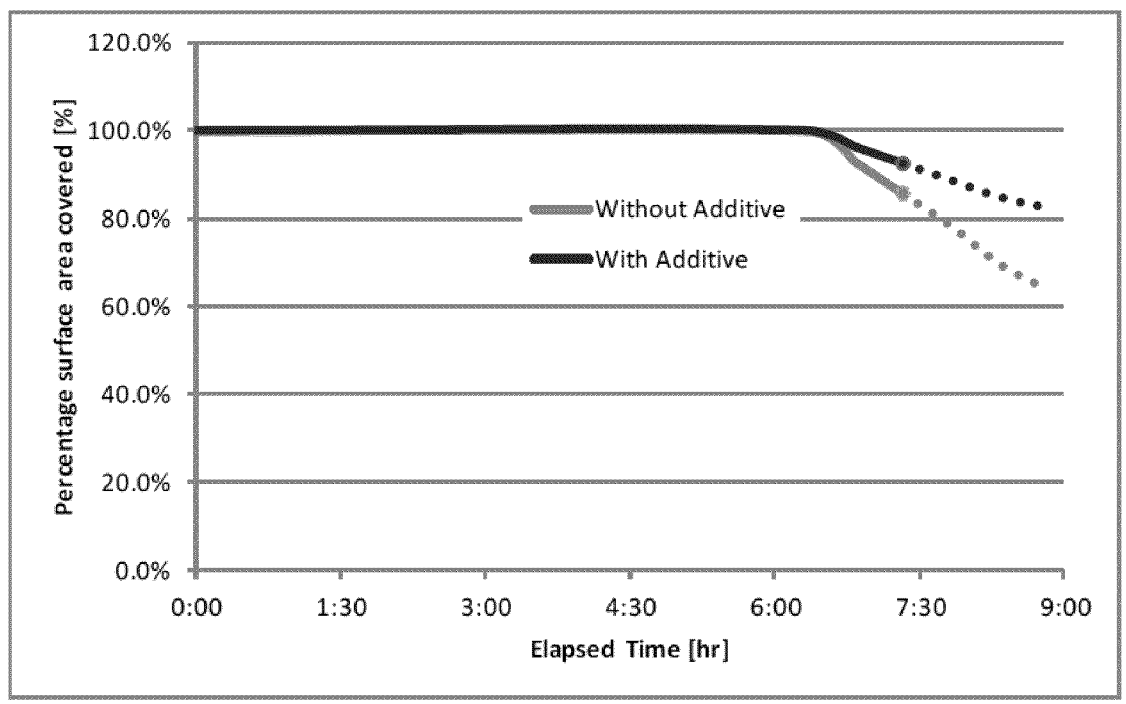
FIG. 1 is graphical illustration of the effect of the methods described herein on surface coverage loss of an anti-icing/de-icing composition as applied to on dry pavement with light traffic. The graph provides a plot of elapsed time (hour) vs. the percentage (%) of surface area covered. The line extending from left (t=0 hr) to right (t=6 hr) represents both surfaces coated by the methods described herein, i.e., with a film-forming polymeric composition and the anti-icing composition ("with additive"), and by the prior art methods of applying only the anti-icing composition ("without additive"). From point (t=6 hr), the line splits: the upper line represents surfaces coated with the methods described herein including a film-forming polymeric composition and the lower line represents surfaces treated by the prior art method of anti-icing composition only. The dotted lines (starting at about t=7.5 hr) extending from the solid lines are projected performances of each method based on a quadratic projection method.

The invention described herein thereby includes a method for anti-icing/de-icing a surface using a film-forming polymeric composition and an anti-icing/de-icing composition. Desirably, the methods minimize the loss of the anti-icing/de-icing composition from the surface, while simultaneously preventing the accumulation of snow and/or ice on the surface. By doing so, the methods accomplish a variety of tasks including, without limitation, preventing snow accumulation or ice formation on a surface, delaying ice formation on a surface, extending the life of an anti-icing/de-icing composition on a surface, surface anti-icing, surface de-icing, or combinations thereof. In one embodiment, the methods are useful for adhering an anti-icing/de-icing composition to a surface.

The crux of the compositions utilized herein is the film-forming polymer component. Specifically, this key component substantially improved bonding and retention of winter maintenance and ice/snow control chemicals on a surface for a prolonged period of time. Thus, use of the film-forming polymeric composition results in significant savings on cost of dispensed chemicals, personnel, vehicle deployment and fleet operations. With this technology, more miles/kilometers of road can be maintained for safe travel with the available people and equipment assets.

A variety of surfaces may be treated according to the methods described herein. Typically, the surfaces receive vehicular, air, or pedestrian traffic. In one embodiment, the surface receives vehicular traffic and is a roadway, bridge, parking lot, exit/entrance ramp, taxiway, among others. In another embodiment, the surface receives pedestrian traffic and is a roadway, bridge, parking lot, sidewalk, among others. In a further embodiment, the surface is an airport surface, i.e., the surface is present at an airport or military base and/or receives air traffic, and is a runway, taxiway, apron, ramp, tarmac, terminal aircraft parking lot, terminal service area, or parking lot, among others. See, e.g., Ketcham et al., "Manual of Practice for an Effective Anti-Icing Program: A Guide for Highway Winter Maintenance Personnel", distributed by the Federal Highway Administration and prepared by the U.S. Army Cold Regions Research and Engineering Laboratory, 1996.

The chemical make-up of the surface is not a limitation of the present invention and may be composed of natural components, man-made components, or a combination thereof. In one embodiment, the surface is a natural component and includes, without limitation, surface is crushed stone, soil, metal, packed clay, brick, Belgian block, cobblestone, concrete, cement, Portland cement, packed recycled asphalt millings, tar and chip, asphalt, macadam, or a combination thereof. In another embodiment, the crushed stone or soil is loose or packed.

A. The Anti-Icing/De-Icing Component

The term "anti-icing", or variations thereof, as used herein refers to the process of preventing snow and/or ice from bonding to a surface. By doing so, anti-icing results in easy removal of snow and/or ice from a surface. Similarly, the term "de-icing", or variations thereof, refers to the process of breaking snow and/or ice bonds from a surface. Both "anti-icing" and "de-icing" are performed using a chemical reagent. However, other non-chemical means may accompany the chemical means described herein for anti-icing, de-icing, or a combination thereof. Such non-chemical means for anti-icing and/or de-icing include, without limitation, shoveling and plowing.

A variety of anti-icing/de-icing compositions may be utilized in the methods described herein. See, e.g., the anti-icing and/or de-icing compositions described in Ketcham cited above and Chappelow et al., "Handbook of Test Methods for Evaluating Chemical Deicers", Strategic highway Research Program, 1992, both of which are hereby incorporated by reference. Typically, the anti-icing/de-icing composition reduces the freezing point of water. In one embodiment, the anti-icing/de-icing composition comprises a salt. Examples of salts useful in the described methods include, without limitation, sodium chloride, calcium chloride, potassium chloride, magnesium chloride, calcium magnesium acetate, ammonium sulfate, magnesium sulfate, urea, or a combination thereof. In one embodiment, the salt is sodium chloride. In another embodiment, the salt is magnesium chloride. In a further embodiment, the anti-icing/de-icing composition contains sugar beet extract, molasses, propylene glycol, ethylene glycol, glycerin, or a combination thereof.

Other non-chemical agents may be applied to the surface as the anti-icing/de-icing composition or may be utilized to aid in anti-icing and/or de-icing the surface. Such non-chemical agents include, without limitation, those described in Ketcham cited above which is incorporated herein by reference. In one embodiment, the non-chemical agent is sugar beet extract, sand, gravel, cinders, molasses, or a combination thereof.

Regardless of the anti-icing/de-icing composition selected, it is typically applied to the surface at an amount of about 5 to about 200 gallons/lane/mile (about 11 to about 470 liters/lane/kilometer). However, one of skill in the art would readily be able to vary the amount of the anti-icing/de-icing composition applied to the surface. In one embodiment, the anti-icing/de-icing composition is applied to the surface at an amount of about 10 to about 50 gallons/lane/mile (about 23 to about 117 liters/lane/kilometer). In a further embodiment, the anti-icing/de-icing composition is applied to the surface at an amount of about 10, 15, 20, 25, 30, 35, 40, 45, or 50 gallons/lane/mile (about 23, 35, 47, 59, 70, 82, 94, 105, or 117 liters/lane/kilometer) or integers or ranges there between. In another embodiment, the anti-icing/de-icing composition is applied to the surface at an amount of about 10 to about 50 gallons/lane/mile (about 23 to about 117 liters/lane/kilometer). In still another embodiment, the anti-icing/de-icing composition is applied to the surface at an amount of about 10 to about 25 gallons/lane/mile (about 23 to about 58 liters/lane/kilometer). In yet a further embodiment the anti-icing/de-icing composition is applied to the surface at an amount of about 25 gallons/lane/mile (about 58 liters/lane/kilometer).

B. The Film-Forming Polymeric Composition Component

The key component of the methods described herein includes a film-forming polymeric composition. Desirably, the film-forming polymeric composition prevents loss of the anti-icing/de-icing composition from the surface. In another embodiment, the film-forming polymeric composition adheres the anti-icing/de-icing composition to the surface. Therefore, any composition which forms a film and is capable of adhering the anti-icing/de-icing composition to a surface may be utilized in the methods described herein. In one embodiment, the film-forming polymeric composition contains a terpene, latex, guar gum, resins, rosins, or a combination thereof. In a further embodiment, the film-forming polymeric composition is a terpene. In still a further embodiment, the film-forming polymeric composition is a polyterpene. In another embodiment, the film-forming polymeric composition is a terpene which contains α-pinene subunits, β-pinene subunits, limonene subunits, myrcene subunits, or a combination thereof. In a further embodiment, the film-forming polymer composition is an α-polyterpene, α-polyterpene resin, β-polyterpene, β-polyterpene resin, d-limonene polyterpene, d-limonene polyterpene resin, styrenated polyterpene resin, unmodified terpene rosin, undisproportionate terpene rosin, partially hydrogenated terpene rosin, highly hydrogenated terpene rosin, terpene rosin ester, hydrocarbon resin, or a combination thereof. In yet another embodiment, the film-forming polymeric composition is the Chemshield® terpenic polymer formulation (Miller Chemical & Fertilizer Corporation). In a further embodiment, the film-forming polymeric composition comprises the Pinolene® formulation (Miller Chemical & Fertilizer Corporation, Hanover, Pa.), i.e., a component of the Chemshield® formulation. In still another embodiment, the film-forming polymeric composition comprises (i) a terpene polymer from pinene, (ii) petrolatum (CAS #8042-47-5), (iii) polybutene (CAS #9003-29-6), and (iv) α-(p-dodecylphenyl)-omega-hydroxypoly(oxyethylene). Still other embodiments may be prepared in view of this description.

One of skill in the art would readily be able to select a suitable terpene for use in the described methods. Desirably, the terpene contains oligomers, dimers, trimers, tetramers, and/or other multimers. In one embodiment, the terpene contains about 10 to about 90% dimer, i.e., about 10, 15, 20, 25, 30, 35, 40, 45, 50, 55, 60, 65, 70, 75, 80, 85, or 90%, or integers or ranges there between. In another embodiment, the terpene contains about 40 to about 60% dimer. In a further embodiment, the terpene contains about 10 to about 50% trimer, i.e., 10, 15, 20, 25, 30, 35, 40, 45, or 50% trimer, or integers or ranges there between. In yet another embodiment, the terpene contains about 20 to about 30%. In still a further embodiment, the terpene contains about 10 to about 50% oligomer, i.e., 10, 15, 20, 25, 30, 35, 40, 45, or 50%, or integers or ranges there between. In another embodiment, the terpene contains about 20 to about 30% oligomer.

The terpene for use in the methods herein desirably has a number average molar weight ($M_n$) of about 250 to about 1000, i.e., 250, 300, 350, 400, 450, 500, 550, 600, 650, 700, 750, 800, 850, 900, 950, or 1000, or integers or ranges there between. In one embodiment, the $M_n$ of the terpene is about 200 to about 500. It is also desirable that the weight average molar weight ($M_w$) of the terpene is about 250 to about 1000, i.e., 250, 300, 350, 400, 450, 500, 550, 600, 650, 700, 750, 800, 850, 900, 950, or 1000, or integers or ranges there between. In one embodiment, the $M_w$ of the terpene is about 250 to about 750. It is further desirable that the z-average molecular weight ($M_z$) of the terpene is about 300 to about 5000, i.e., 300, 500, 750, 1000, 1250, 1500, 1750, 2000, 2250, 2500, 3000, 3250, 3500, 3750, 4000, 4250, 4500, 4750, or 500, or integers or ranges there between. In one embodiment, the $M_z$ of the terpene is about 300 to about 1000.

In one embodiment, the film-forming polymeric composition contains sufficient amount of a terpene. For example, the film-forming polymeric composition contains about 10 to about 90% w/w of a terpene, i.e., about 10, 15, 20, 25, 30, 35, 40, 45, 50, 55, 60, 65, 70, 75, 80, 85, or 90% w/w, or integers or ranges there between. In another embodiment, the film-forming polymeric composition contains about 65 to about 75% w/w of a terpene.

In another embodiment, the $M_n$ of the film-forming polymeric composition is about 250 to about 1000, i.e., 250, 300, 350, 400, 450, 500, 550, 600, 650, 700, 750, 800, 850, 900, 950, or 1,000 or integers or ranges there between. For example, the $M_n$ of the film-forming polymeric composition is about 325 to about 400.

In a further embodiment, the $M_w$ of the film-forming polymeric composition is about 250 to about 1000, i.e., 250, 300, 350, 400, 450, 500, 550, 600, 650, 700, 750, 800, 850, 900, 950, or 1,000 or integers or ranges there between. For example, the $M_w$ of the film-forming polymeric composition is about 650 to about 860.

In still another embodiment, the $M_z$ of the film-forming polymeric composition is about 300 to about 5000, i.e., 300, 500, 750, 1000, 1500, 2000, 1250, 1300, 1350, 1400, 1450, or 1500 or integers or variations there between. For example, the M, of the film-forming polymeric composition is about 2300 to about 3500.

Suitably, the viscosity and/or density of the film-forming polymeric composition is sufficient to remain on or sufficiently close to the surface being treated. One of skill in the art would readily be able to determine the necessary viscosity for the film-forming polymeric composition. In one embodiment, the viscosity of the film-forming polymeric composition is about 200 to about 10000 centipoise, i.e., about 200, 500, 1000, 2000, 3000, 4000, 5000, 6000, 7000, 8000, 9000, or 1000, or integers or ranges there between, at 20° C. In another embodiment, the viscosity of the film-forming polymeric composition is about 1000 to about 4000 centipoise at 20° C. In a further embodiment, the density of the film-forming polymeric composition is about 0.85 to about 1.0 grams/milliliter, i.e., 0.85, 0.86, 0.87, 0.88, 0.89, 0.90, 0.91, 0.92, 0.93, 0.94, 0.95, 0.96, 0.97, 0.98, 0.99, 1.0, or integers or ranges there between, at about 20° C. In yet another embodiment, the density of the film-forming polymeric composition is about 0.92 to about 0.96 grams/milliliter.

C. Optional Components

In addition to the anti-icing/de-icing composition and film-forming polymeric composition, a variety of optional components may utilized to further promote anti-icing and/or deicing, assist in the performance of the film-forming polymeric composition, or otherwise enhance the methods described herein. In one embodiment, the optional component is applied directly to the surface, i.e., before the anti-icing/de-icing composition and/or film-forming polymeric composition, concurrently with the anti-icing/de-icing composition and/or film-forming polymeric composition, and/or after the anti-icing/de-icing composition and/or film-forming polymeric composition. In another embodiment, the optional component is combined with the anti-icing/de-icing composition. In a further embodiment, the optional component is combined with the film-forming polymeric composition. In still another embodiment, the optional component is combined with the anti-icing/de-icing composition and film-forming polymeric composition.

One of skill in the art would readily be able select a suitable optional component for use in the methods described herein. See, e.g., the anti-icing/de-icing components described by Ketcham cited above which is incorporated herein by reference. In one embodiment, the optional component is, without limitation, a viscosity modifier, a flexibility enhancer, an emulsification system, or a combination thereof.

In one embodiment, the optional component is a viscosity modifier. The term viscosity modifier as used herein refers to a reagent which varies a chemical composition's change in viscosity when subjected to a change in temperature. One of skill in the art would readily be able to select a suitable viscosity modifier for use in the methods described herein. Desirably, the viscosity modifier selected from among water, petrolatum, non-flammable petroleum, vegetable based solvent, seed based solvent, methylated seed oil, fatty acid, or a combination thereof. In one embodiment, the methylated seed oil is derived from soy canola, palm kernel, corn, or mixtures thereof. The viscosity modifier is present in the film-forming polymeric composition comprises at an amount of about 10 to about 90% w/w, i.e., about 10, 15, 20, 25, 30, 35, 40, 45, 50, 55, 60, 65, 70, 75, 80, 85, or 90% w/w, or integers or ranges there between. In another embodiment the viscosity modifier is present in the film-forming polymeric composition at an amount of about 1 to about 10% w/w.

In a further embodiment, the optional component is a flexibility enhancer. The term "flexibility enhancer" as used herein refers to a reagent which imparts flexibility to the film-forming polymeric composition, anti-icing/de-icing composition, or combination thereof. One of skill in the art would readily be able to select a suitable flexibility enhancer for use in the methods described herein. See, e.g., the flexibility enhancers described in Olah, "Hydrocarbon Chemistry", 2$^{nd}$ Edition, John Wiley & Sons, 2003, which is hereby incorporated by reference. In one embodiment, the flexibility enhancer is a sticking agent. In another embodiment, the flexibility enhancer is a hydrocarbon polymer. In a further embodiment, the flexibility enhancer is a polymer derived from butene, isobutylene, castor oil, petroleum oil, vegetable oil, seed oil, and formaldehyde. When the flexibility enhancer is a hydrocarbon polymer, it desirably has an $M_n$ of about 300 to about 10,000, i.e., about 300, 500, 1,000, 2,000, 3,000, 4,000, 5,000, 6,000, 7,000, 8,000, 9,000, or 10,000 or integers or ranges there between. In one aspect, the $M_n$ of the hydrocarbon polymer is about 500 to 1500. In still another embodiment, the flexibility enhancer is polybutene and polyisobutylene. In yet a further embodiment, the flexibility enhancer is present in the film-forming polymeric composition at an amount of about 1 to about 50% w/w, i.e., about 1, 5, 10, 15, 20, 25, 30, 35, 40, 45, or 50 w/w or integers or ranges there between. In another embodiment, the flexibility enhancer is present in the film-forming polymeric composition at an amount of about 1 to about 25% w/w.

In still another embodiment, the optional component is an emulsification system. The term "emulsification system" as used herein refers to a chemical reagent which keeps the components utilized in the described methods well dispersed. One of skill in the art would readily be able to select a suitable emulsification system for use in the methods described herein. See, e.g., the emulsification systems described in Rosen, "Surfactants and Interfacial Phenomena, 2$^{nd}$ Ed., John Wiley and Sons (1989) and Myers, "Surfactant Science and Technology", VCH Publishers (1988), which are hereby incorporated by reference. In one embodiment, the emulsification system is a surfactant. In another embodiment, the emulsification system is an alcohol ethoxylate, tallow amine ethoxylate, fatty acid ethoxylate, alkyl alkoxylate, alkylarylsulfonate, alkylarylethoxylate, fatty acid, or a combination thereof. In one example, the fatty acid is oleic acid, a tall oil fatty acid, or a combination thereof. In another example, the alkylarylethoxylate is an alkylphenol ethoxylate. In another embodiment, the emulsification system is present in the film-forming polymeric composition at an amount of about 1 to about 15% w/w, i.e., 1, 2, 3, 4, 5, 6, 7, 8, 9, 10, 11, 12, 13, 14, or 15 w/w or integers or ranges there between. In a further embodiment, the emulsification system is present in the film-forming polymeric composition at an amount of about 3 to about 10% w/w.

D. Desirable Methods

In one embodiment, a method for minimizing loss of an anti-icing/de-icing composition from a surface is provided and includes applying a film-forming polymeric composition and the anti-icing/de-icing composition to the surface, wherein the film-forming polymeric composition adheres the anti-icing/de-icing composition to the surface.

In another embodiment, a method for adhering an anti-icing/de-icing composition to a surface is provided and includes applying a film-forming polymeric composition and the anti-icing/de-icing composition to the surface, wherein the film-forming polymeric composition adheres the anti-icing/de-icing composition to the surface.

In a further embodiment, a method for preventing snow accumulation or ice formation on a surface is provided and includes applying a film-forming polymeric composition and an anti-icing/de-icing composition to the surface, wherein the film-forming polymeric composition adheres the anti-icing/de-icing composition to the surface.

In yet another embodiment, a method for delaying ice formation on a surface is provided and includes applying a film-forming polymeric composition and an anti-icing/de-icing composition to the surface, wherein the film-forming polymeric composition adheres the anti-icing/de-icing composition to the surface.

In still a further embodiment, a method for extending the life of an anti-icing/de-icing composition on a surface is provided and includes applying a film-forming polymeric composition and an anti-icing/de-icing composition to the surface, wherein the film-forming polymeric composition adheres said the anti-icing/de-icing composition to the surface.

In yet a further embodiment, a method for surface anti-icing is provided and includes applying a film-forming polymeric composition and an anti-icing/de-icing composition to the surface, wherein the film-forming polymeric composition adheres the anti-icing/de-icing composition to the surface.

In another embodiment, a method for surface de-icing is provided and includes applying a film-forming polymeric composition and an anti-icing/de-icing composition to the surface, wherein the film-forming polymeric composition adheres the anti-icing/de-icing composition to the surface.

In one aspect, a method is provided for (i) minimizing loss of an anti-icing/de-icing composition from a surface, (ii) adhering an anti-icing/de-icing composition to a surface, (iii) preventing snow accumulation or ice formation on a surface, (iv) delaying ice formation on a surface, (v) extending the life of an anti-icing/de-icing composition on a surface, (vi) surface anti-icing, or (vii) surface de-icing and includes applying a film-forming polymeric composition and an anti-icing/deicing composition to the surface. The film-forming polymeric composition adheres said anti-icing/de-icing composition to the surface and contains about 10 to about 90% w/w of a terpene, about 10 to about 90% w/w of a viscosity modifier, about 1 to about 50% w/w of a flexibility enhancer, and about 1 to about 10% w/w of an emulsification system.

In another aspect, a method is provided for (i) minimizing loss of an anti-icing/de-icing composition from a surface, (ii) adhering an anti-icing/de-icing composition to a surface, (iii) preventing snow accumulation or ice formation on a surface, (iv) delaying ice formation on a surface, (v) extending the life of an anti-icing/de-icing composition on a surface, (vi) surface anti-icing, or (vii) surface de-icing and includes applying a film-forming polymeric composition and an anti-icing/de-icing composition to the surface. The film-forming polymeric composition adheres said anti-icing/de-icing composition to the surface and contains about 65 to about 75% w/w of a terpene, about 1 to about 10% w/w of a viscosity modifier, about 1 to about 50% w/w of a flexibility enhancer, and about 3 to about 10% w/w of an emulsification system.

Other compositions for use in the methods described herein may be prepared containing additional components selected by those of skill in the art using the teachings of this specification.

E. Methods of Anti-Icing and/or De-Icing

As discussed above, the methods provided herein are effective in anti-icing, de-icing, or a combination thereof, a surface using the film-forming polymeric composition and anti-icing/de-icing composition described above. These methods also advantageously reduce costs to surrounding communities in several ways. First, because the film-forming polymeric composition adheres the anti-icing/de-icing composition to the surface, less anti-icing/de-icing composition is worn off of the surface either by water or vehicular wear. Therefore, it is not necessary to reapply the anti-icing/de-icing composition to the surface over and over. Second, since anti-icing and/or de-icing can be performed at off-peak times which require the payment of overtime, the methods thereby impart savings to these anti-icing/de-icing companies. Third, because fewer accidents are encountered, fewer emergency vehicles are utilized, thereby reducing costs to communities.

Also desirable is the fact that, because the anti-icing/de-icing composition remains fixed to the surface for a longer period of time, less erosion will be imparted to the environment due to run-off from the surfaces.

By doing so, the methods accomplish a variety of tasks including, without limitation, preventing snow accumulation or ice formation on a surface, delaying ice formation on a surface, extending the life of an anti-icing/de-icing composition on a surface, surface anti-icing, surface de-icing, or combinations thereof. In one embodiment, the methods are useful for adhering an anti-icing/de-icing composition to a surface.

The crux of the compositions utilized herein is the film-forming polymer component. Specifically, this key component substantially improved bonding and retention of winter maintenance and ice/snow control chemicals on a surface for a prolonged period of time. Thus, use of the film-forming polymeric composition results in significant savings on costs of dispensed chemicals, personnel, vehicle deployment time and fleet operations.

A variety of surfaces may be treated according to the methods described herein. Typically, the surfaces receive vehicular, air, or pedestrian traffic. In one embodiment, the surface receives vehicular traffic and is a roadway, bridge, parking lot, exit/entrance ramp, taxiway, among others. In another embodiment, the surface receives pedestrian traffic and is a roadway, bridge, parking lot, sidewalk, among others. In a further embodiment, the surface is an airport surface, i.e., the surface is present at an airport and/or receives air traffic, and is a runway, taxiway, apron, ramp, tarmac, terminal aircraft parking lot, terminal service area, access road, or parking lot, among others.

The chemical make-up of the surface is not a limitation of the present invention and may be composed of natural components, man-made components, or a combination thereof. In one embodiment, the surface is a natural component and includes, without limitation, surface is crushed stone, soil, metal, packed clay, brick, Belgian block, cobblestone, concrete, cement, Portland cement, packed recycled asphalt millings, tar and chip, asphalt, macadam, or a combination thereof. In another embodiment, the crushed stone or soil is loose or packed. See, Ketcham cited above which is incorporated herein by reference.

The timing of application of the anti-icing/de-icing composition, film-forming composition, and optional components also is not a limitation of the methods described herein. In one embodiment, the surface is dry prior to application of the anti-icing/de-icing composition, film-forming composition, and/or optional components. In another embodiment, the surface is damp prior to application of the anti-icing/de-icing composition, film-forming composition, and/or optional components. In a further embodiment, the surface is wet prior to application of the anti-icing/de-icing composition, film-forming composition, and/or optional components. In yet another embodiment, the surface contains ice and water prior to application of the anti-icing/de-icing composition, film-forming composition, and/or optional components. In still a further aspect, the surface is covered by ice prior to application of the anti-icing/de-icing composition, film-forming composition, and/or optional components.

The weather conditions also do not impede the ability of the provided methods to work for their intended purposes. In one embodiment, the anti-icing/de-icing composition, film-forming composition, and/or optional components are applied to the surface prior to snowfall and/or rainfall. In another embodiment, the anti-icing/de-icing composition, film-forming composition, and/or optional components are applied to the surface during snowfall and/or rainfall. In a further embodiment, the anti-icing/de-icing composition, film-forming composition, and/or optional components are applied to the surface after snowfall and/or rainfall. One of skill in the art would readily be able to determine when the anti-icing/de-icing composition, film-forming composition, and/or optional components should be applied to the surface. In one embodiment, the anti-icing/de-icing composition, film-forming composition, and/or optional components may be applied to the surface in sufficient time to permit adherence of the anti-icing/de-icing composition to the surface. In another embodiment, the anti-icing/de-icing composition, film-forming composition, and/or optional components may be applied to the surface at least about 24 hours prior to rainfall and/or snowfall. In a further embodiment, the anti-icing/de-icing composition, film-forming composition, and/or optional components is applied to the surface about 24 hours or less, i.e., 24, 23, 22, 21, 20, 19, 18, 17, 16, 15, 14, 13, 12, 11, 10, 9, 8, 7, 6, 5, 4, 3, 2, or 1 hour, prior to rainfall and/or snowfall.

The methods described herein are effective in anti-icing and/or de-icing at a variety of environmental and surface temperatures. One of skill in the art would readily be able to vary the components required to perform the described methods depending on the outside temperature and temperature of the surface.

The order of application of the anti-icing/de-icing composition and film-forming polymeric composition should not be considered a limitation of the methods described herein. In one embodiment, the anti-icing/de-icing composition is applied to the surface before the film-forming polymeric composition. In another embodiment, the anti-icing/de-icing composition is applied to the surface concurrently with the film-forming polymeric composition. In a further embodiment, the film-forming polymeric composition is applied to the surface before the anti-icing/de-icing composition. The amount of film-forming polymeric composition applied to the surface must be sufficient to adhere the anti-icing/de-icing composition to the surface. In one embodiment, the film-forming polymeric composition is applied to the surface at an amount of about 1 pint/lane/mile (about 0.125 gallons/lane/mile) to about 10 gallons/lane/mile, i.e., 0.125, 0.25, 0.375, 0.5, 0.625, 0.75, 0.875, 1, 2, 3, 4, 5, 6, 7, 8, 9, or 10 gallons/lane/mile (about 0.29 to about 23 liters/lane/kilometer) or integers or ranges there between. In a further embodiment, the film-forming polymeric composition is applied to the surface at an amount of about 1 quart/lane/mile (0.25 gallons/lane/mile or 0.65 liters/lane/kilometer).

The effectiveness of the film-forming polymeric composition described herein in adhering an anti-icing/de-icing composition to a surface can be determined. In one embodiment and as discussed and demonstrated in the examples, such adherence can be assessed visually. Adherence can also be measured by physical means. In another embodiment, sections of surfaces can be treated using controls and test samples. In this embodiment, the control solution may contain a known amount of an anti-icing/de-icing composition. The control surface may be prepared by spraying the control solution onto a first surface section. The test solution may be prepared by mixing a known amount of a film-forming polymeric composition and known amount of an anti-icing/de-icing composition. The test solution may be sprayed onto a second surface section, i.e., the test surface. The control and test surfaces may be, independently, placed in reservoirs, the control reservoir and test reservoir, respectively. Desirably, the control and test reservoirs are composed of materials which do not absorb the anti-icing/de-icing composition or film-forming polymeric composition and are slightly larger than the control and test surfaces, respectively. Suitably, the control and test surfaces are then elevated and sprayed with water using a method which mimics rainfall and the control. The control and test surfaces dry in natural conditions, i.e., without exogenous heat sources. No artificial or natural precipitation conditions are applied or occur during the drying period. After completion of the drying period, the amount of anti-icing/de-icing composition present on the control surface and test surface may be measured. The amount of anti-icing/de-icing composition present in the control reservoir and test reservoir also may be measured.

F. Preparation of the Compositions in the Described Methods

The methods for preparing the compositions discussed herein generally include combining or premixing anti-icing/de-icing composition and the film-forming composition. The combination or premixing of these reagents may be performed by the seller or consumer. The premixed composition may optionally be stored for later use as determined by the consumer. The composition may also be diluted, if necessary, as determined by one of skill in the art, and utilized to perform the methods described herein.

Specifically, the methods are performed by mixing the film-forming polymeric composition and the anti-icing/de-icing composition. The optional components noted as described above may also be included in this admixture. Desirably, these components are mixed at temperatures and conditions which do not result in freezing one or more of the components. In one embodiment, the film-forming polymeric composition and the anti-icing/de-icing composition are mixed at a temperature at or above about $-10°$ C., i.e., $-10$, $-5$, $0$, $5$, $10°$ C., etc. or integers or ranges there between. In another embodiment, the film-forming polymeric composition and the anti-icing/de-icing composition are mixed at a temperature of at least about $10°$ C. One of skill in the art would readily be able to determine the amount of time required to mix the film-forming polymeric composition and anti-icing/de-icing composition. Typically, the film-forming polymeric composition and anti-icing/de-icing composition are mixed until the solid particles are well dispersed in the liquid medium.

G. Kits of the Invention

In yet another aspect, a kit is provided to enable for admixture or use of film-forming polymeric composition and/or anti-icing/de-icing composition. Desirably, such kits utilized to perform the methods described herein. A kit may include the components required to perform the described method(s). In one embodiment, the kit includes one container which contains the film-forming polymeric composition and a second container which contains the anti-icing/de-icing composition. These components of these two containers may be combined for use at the purchaser's discretion. In another embodiment, the kit may contain one "pre-mixed" container which contains the film-forming polymeric composition and the anti-icing/de-icing composition.

Additional containers may be further included in the kits. These additional containers may independently contain any of the optional components identified above. Such a kit may also contain instructions for mixing the components of containers or for use thereof in the described methods. Further provided in the kits are containers for mixing the components of the containers, disposable gloves, and/or sprayers for application of one or more components of the containers. One of skill in the art could assemble any number of kits with the information and components necessary to perform the method on a specimen for analysis.

In one embodiment, a kit is provided and contains (a) a first container which includes a film-forming polymer composition, and (b) a second container which includes an anti-icing/de-icing composition. One or more additional containers can be included in the kit and may contain any one of the optional reagents noted above.

In another embodiment, a kit is provided and contains one container which includes film-forming polymer composition and an anti-icing/de-icing composition. One or more additional containers can be included in the kit and may contain any one of the optional reagents noted above.

In yet another embodiment, a kit is provided and contains one container which includes film-forming polymer composition, anti-icing/de-icing composition, and one or more of the optional reagents noted above. In this embodiment, the anti-icing/de-icing composition contains about 0.005% to about 10%, i.e., 0.005, 0.10, 0.5, 1, 1.5, 2, 2.5, 3, 3.5, 4, 4.5, 5, 5.5, 6, 6.5, 7, 7.5, 8, 8.6, 9, 9.5, or 10%, by volume of the film-forming polymeric composition. In another embodiment, the anti-icing/de-icing composition contains about 0.1 to about 5% by volume of the film-forming polymeric composition. In a further embodiment, the anti-icing/de-icing composition contains about 1% by volume of the film-forming polymeric composition.

In a further embodiment, a kit is provided and contains (i) a first container which includes the anti-icing/de-icing composition and (ii) a second container which includes about 10 to about 90% w/w of a terpene, about 10 to about 90% w/w of a viscosity modifier, about 1 to about 50% w/w of a flexibility enhancer, and about 1 to about 10% w/w of an emulsification system.

In yet another embodiment, a kit is provided and contains (i) a first container which includes the anti-icing/de-icing composition and (ii) a second container which includes about 65 to about 75% w/w of a terpene, about 1 to about 10% w/w of a viscosity modifier, about 1 to about 50% w/w of a flexibility enhancer, and about 3 to about 10% w/w of an emulsification system.

The following examples are illustrative only and are not intended to be a limitation on the present invention.

EXAMPLES

The following examples illustrate the ability of a film-forming polymer composition to improve the ability of an anti-icing/de-icing chemical to bond to road surfaces and resist wear by traffic and weather conditions. The tests performed in these examples evaluated surface coverage of the film-forming polymeric composition as a function of time, traffic and weather conditions. Specifically, these examples provide data for tests conducted on dry and damp surfaces; in the presence and absence of traffic (both light and heavy); and in the presence and absence of simulated and natural rain; in the presence and absence of snow.

Example 1

Effect of Light-Traffic on a Dry Surface Coated with a Film-Forming Polymeric Composition This example illustrates the effectiveness of a composition described herein for anti-icing a dry surface in the presence and absence of light vehicular traffic. Specifically, the ability of the composition to adhere an anti-icing composition to dry surfaces was analyzed. The surface comprised 12'×12' square area pavement sections which were marked by painting geometric boundaries and identifying signs onto the pavement.

A. Preparation of the Samples

The control sample was prepared by mixing a 25-26% solution of magnesium chloride (about 9 ounces, i.e., 255 grams) with a color dye (about 1 ounce, i.e., 28.3 grams, of the Bright Dyes™ reagent) and this final solution was agitated/mixed until and during application to the pavement section.

The test sample was prepared by mixing the Chemshield® formulation (about 0.08 ounces, i.e., 2.27 grams) with water (about 1 ounce, i.e., 28.3 grams), followed by mixing with a color dye (about 1 ounce, i.e., 28 grams, of the Bright Dyes® reagent, Kingscote Chemicals, Miamisburg, Ohio). To this solution was then added an anti-icing agent solution, i.e., a 25-26% solution of magnesium chloride (about 9 ounces, i.e., 255 grams). This final solution was agitated/mixed until and during application to the pavement sections.

The control and test samples were applied to respective pavement sections using separate handheld sprayers and the coated pavement sections were permitted to dry in natural conditions, i.e., without exogenous heat sources and traffic, for 6 hours. Nor were any artificial or natural precipitation conditions applied or occurring during the drying or the testing period. The sprayers containing the test samples were thoroughly cleaned after each chemical application to avoid contamination.

After the pavement sections had dried, i.e., 6 hours after application, light passenger-car traffic was simulated using a medium-sized vehicle travelling at low speeds on the surfaces. The testing continued for 1.5 hours and the data were collected.

B. Data Collection

To measure covered surface area, digital photography and digital image processing was used. The covered surface area was measured with the aid of a dye that is mixed with the anti-icing/de-icing composition and produced florescent light reflection when lit with UV light (black light). A high-resolution special optics camera (Larson Institute) was used in the digital photography. In the first phase, a set of camera stabilization and attachment fixtures and a set of special-purpose light stands and fixtures for the UV lights were used. The lighting, camera, special UV lens and filters and the dye, were used to take digital photographs of the test surfaces to calibrate the equipment. The photographs were color calibrated and calibrated with regard to physical dimensions of the surface areas. The lighting stands and lighting conditions were tuned to ensure quality photographs that met the requirements of digital image processing techniques.

The digital photographs taken for calibration purposes were processed using image-processing software. The image-processing software was developed together with all necessary algorithms to accurately measure the absolute and percentage surface areas covered with the chemical versus the uncovered areas using these images.

C. Data Analysis

The mathematical algorithms utilized to process the images were utilized to produce the quantitative measurements. The results of this task were a standardized digital imaging setup that included the lighting conditions, digital imaging stand, and setup with geometric and optical conditions determined for optimal imaging, fixed and documented. The image processing steps of the analysis are described in detail with simple examples in the following sections.

(i) Image Processing

The first step was standardizing all images with a 2D bi-cubic spatial transformation to remove lens distortions and projections from the image introduced by the angle and distance of the camera from the surface test area. The rectified image then was re-sampled using a simple bi-linear and bi-cubic pixel interpolation technique to transform all images to the same digital image size of 512×512 pixels. This resulted in the production of distortion-free, uniformly sized images across the entire experiment. This procedure removed all possible variations and kept the images independent of the small but possibly significant variations. During the experiment, the pictures of the tested surfaces were taken from a height of 24 feet above the ground to ensure the initial photograph of the test surface to be as high quality as possible.

The second step used a simple luminosity transformation with a morphological background luminosity estimation to remove all possible effects of different lighting conditions. Pictures were taken in the outdoor environment in adverse weather and lighting conditions; this technique ensured correction of the different conditions. In addition to the lighting correction, a special digital color filter was applied to the image. The dye utilized in the below-noted compositions delivered two distinct colors observed by the human eye, depending on whether it was dry or wet. The dye, however, had a special luminescence invisible to the human eye under ultraviolet lighting conditions. Two powerful UC light fixtures delivered sufficient UV light to use this special feature of the used dye.

The third step used a sophisticated clustering algorithm to identify the surface areas that were covered with the film-forming polymeric composition containing the dye and separating them from those areas of the surface which were not covered by the film-forming polymeric composition. The algorithm used a two-phase iterative algorithm to minimize the sum of point-to-centroid distances, summed over all existing different mean clusters using the "K-mean" algorithm. The first phase used batch updates, where each of the iterations consisted of reassigning points to their nearest cluster centroid, all at once, followed by recalculation of cluster centroids. This phase converged to a single solution that was a local minimum; that is, a partition of the image space where moving any single point to a different cluster no longer decreased the total sum of the distances. The second phase used online updates, where points were individually reassigned if doing so reduced the sum of the distances, and cluster centroids were recomputed after each reassignment. Each of the iterations during the second phase consisted of one pass through all the picture points. The second phase converged to a local minimum, which represented the located optimal segmenting of the picture points into areas covered with chemicals containing the dye.

(ii) Image Analysis

The results of the image processing algorithm were two integer numbers, one represented the number of pixels in the picture that were in one of the clustered areas classified as film-forming polymeric composition covered, and the other represented the number of pixels which belonged to clusters identified as pavement surface not covered with film-forming polymeric composition. The sum of the obtained surface areas covered by chemicals was used to calculate the percentage of surface area with anti-icing chemical as the percentage of the total image size.

The surface coverage obtained from the measurement on each of the surfaces taken immediately after the application of the chemicals was obtained and the calculated number was used as the basis for further evaluation. This permitted compensation of unequal application of chemicals on surfaces from test to test and from surface to surface. Thus, since the chemicals were applied to the 12×12' squares by hand, the initial covered surface area was changing on an average by ±5% around a mean of 30%. The use of the initial covered surface area as 100% bases calculated for each test square individually and the comparative analysis using the initial covered surface area as basis allowed a true comparison between the different scenarios.

The data was then compiled into a simple database, with all the high-resolution digital images cross referenced to test number, date, and time. The digital images were used to determine the percentage of surface covered by the film-forming polymeric composition. The digital images permitted generation of a precise color segmentation digital image processing algorithm. The algorithm compensated for different lighting conditions and used a sophisticated image color intensity based K-means segmentation algorithm to identify the surface area that is covered with the compositions containing film-forming polymer and dye versus the area that was not covered.

D. Results

The data indicate that the performance of the anti-icing/de-icing composition in the presence and absence of the film-forming polymeric composition were comparable in the absence of traffic. However, the light passenger vehicle traffic initiated markedly faster deterioration of the surface coated with the film-forming polymeric composition than the surface lacking the film-forming polymeric composition.

Specifically, FIG. 1 provides a graphical analysis of the measurements obtained during the first 7.5 hours of testing. These results were then utilized to project further surface coverage losses using a third-order estimation method.

The results indicate that the surface coated with control sample lost about 16% of the original surface coverage in the first 7.5 hours of traffic in a dry environment. However, the surface coated with the test sample deteriorated less than about 8%. Thus, under dry conditions with light traffic, the film-forming polymeric composition improved surface coverage by a 193% margin.

Example 2

Effect of Light-Traffic and Precipitation on a Dry Surface Coated with a Film-Forming Polymeric Composition This example illustrates the effectiveness of a composition described herein for anti-icing a dry surface. The data provided herein was collected after the surface was exposed to rain and snow. Specifically, the ability of the composition to adhere an anti-icing composition to dry surfaces was analyzed.

A. The Samples

The control and test samples of this example were identical to the test and control samples of example 1. The control and test samples were applied to respective pavement sections using separate handheld sprayers and the coated pavement sections were permitted to dry in natural conditions, i.e., without exogenous heat sources and traffic, for 6 hours. Nor were any artificial or natural precipitation conditions applied or occurring during the drying or the testing period. The sprayers containing the test samples were thoroughly cleaned after each chemical application to avoid the contamination.

A system to produce measurable and controllable precipitation conditions of rain onto the test surfaces was utilized and was based on commercially available hardware components, vehicles, pumps, and extraneous components. The final system was representative of natural rainfall and delivered precipitation from about 2.5 millimeters/hour to about 25 millimeters/hour to the surfaces at temperature above about −5° C.

After the pavement sections had dried, i.e., 6 hours after application, light passenger-car traffic was simulated using a medium-sized vehicle travelling at low speeds on the surfaces together with a light 0.05 in/hour rain was introduced. The rain amount of rain wads increased every 5 minutes to a final rate of 0.1 in/hour. The testing continued for 1.5 hours and the data was then analyzed.

Image collected continued for 7 days in which naturally occurring precipitation took place for 5 of those 7 days and included natural rain and snow falling at a rate of about 0.005 in/hour to about 0.5 in/hour. This rate range was calculated using the water equivalent of snow. The data were then collected and analyzed using the procedures in sections B and C of example 1.

B. Results

Figure 2:
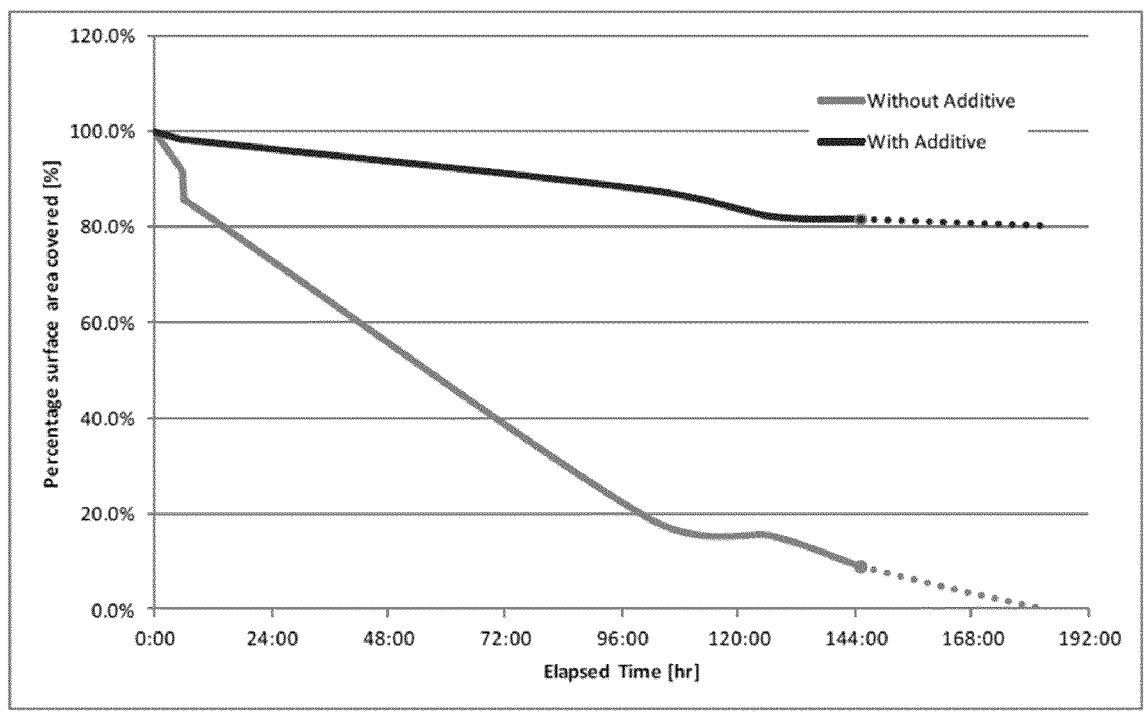
FIG. 2 is graphical illustration of the effect of a method described herein on surface coverage loss of an anti-icing/de-icing composition applied to dry pavement under wet and light-traffic conditions. The graph provides a plot of elapsed time (hour) vs. the percentage (%) of surface area covered. The lower line represents surfaces treated with prior art methods of applying an anti-icing composition only. The upper line represents surfaces coated with a method described herein including applying a film-forming polymeric composition with an anti-icing composition. The dotted lines (starting at about t=144 hr) extending from the solid lines are projected performances of each method based on a quadratic projection method.

The data show that the performances of the anti-icing/de-icing composition in the presence and absence of the film-forming polymer were similar to the results of Example 1 until precipitation and light passenger vehicle traffic commenced. However, once traffic started, deterioration of the surface lacking a film-forming polymeric composition coating was markedly faster than the surface containing a film-forming polymeric composition coating. In fact, deterioration continued throughout the following 6 days where different precipitation ranges occurred. The measured surface coverage loss is depicted in FIG. 2.

These data show that during the 145-hour testing cycle with repeated and different rain precipitation conditions, surfaces coated with the film-forming polymeric composition showed an about 19% coverage loss, while surfaces coated only with the anti-icing/de-icing composition lost more than 90% of surface coverage. Further, the data obtained under the rain precipitation showed that surfaces coated with the film-forming polymeric composition was remarkably better, showing a close to an about 493% increase in covered surface area compared to the surfaces treated with anti-icing/de-icing composition alone.

Example 3

Effect of Heavy-Traffic and Precipitation on a Dry Surface Coated with a Film-Forming Polymeric Composition This example illustrates the effectiveness of a composition described herein for anti-icing a dry surface. The data provided herein was collected after the surface was exposed to heavy-traffic and precipitation. Specifically, the ability of the composition to adhere an anti-icing composition to dry surfaces was analyzed.

A. The Samples

The control and test samples of this example were identical to the test and control samples of example 1. The control and test samples were applied to respective pavement sections using separate handheld sprayers and the coated pavement sections were permitted to dry in natural conditions, i.e., without exogenous heat sources and traffic, for 6 hours. Nor were any artificial or natural precipitation conditions applied or occurring during the drying or the testing period. The sprayers containing the test samples were thoroughly cleaned after each chemical application to avoid contamination.

After the pavement sections had dried, i.e., 6 hours after application, heavy surface traffic was simulated using heavy-duty buses (14,000 pounds; 6350.3 kilograms) travelling at 20 miles/hour (32.2 kilometers/hour). The heavy surface traffic continued on the pavement sections for 3 hours. A heavy rain simulation was then initiated using the precipitation machine described in Example 1 at a rate of about 0.5 to about 0.1 in/hour. The rate was increased in two steps using 15 minute intervals, during which the heavy bus traffic continued throughout the precipitation. The rain simulation continued for 0.5 hours. After precipitation ceased, the heavy bus traffic continued. About 1.5 hours after the simulated rain conditions ceased, a natural snow fell and continued for about 1 hour. The heavy bus traffic continued during snowfall.

B. Results

Figure 3:
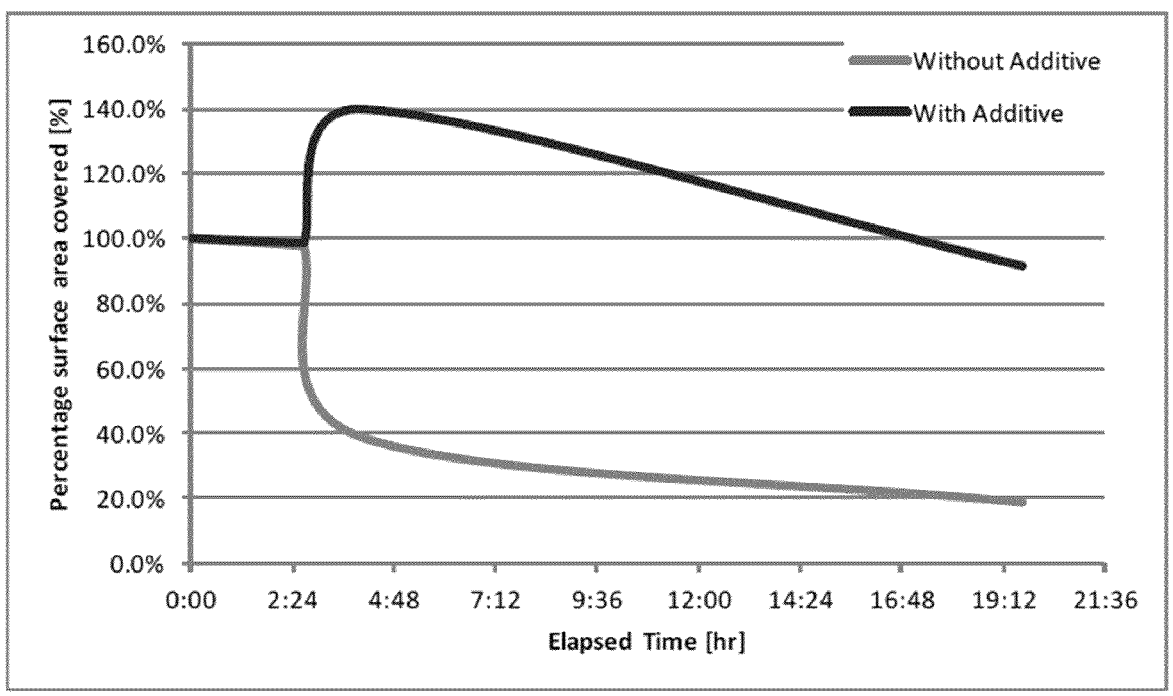
FIG. 3 is graphical illustration of the effect of a method as described herein on surface coverage loss of an anti-icing/de-icing composition applied to dry pavement under wet, snowy, and heavy-traffic conditions. The graph provides a plot of elapsed time (hour) vs. the percentage (%) of surface area covered. The line extending from left (t=0 hr) to right (t=2:24 hr) represents surfaces treated with a method as described herein including applying a film-forming polymeric composition with the anti-icing composition vs. the prior art method of applying an anti-icing composition only. From point (t=2: 24 hr), the line splits: the upper line represents surfaces treated by the method described herein and the lower line represents surfaces treated with the prior art method.

The data show that the performances of the anti-icing/de-icing composition in the presence and absence of the film-forming polymer were similar to the results of Example 1 and 2 until precipitation and heavy vehicle traffic commenced. However, once traffic started, deterioration of the surface lacking a film-forming polymeric composition coating was markedly faster than the surface containing a film-forming polymeric composition coating. In fact, deterioration continued throughout the following 6 days where different precipitation ranges occurred. The measured surface coverage loss is depicted in FIG. 3.

It is noted that during the 20-hour testing cycle with heavy rain precipitation, followed by natural snow precipitation conditions, the surface coated with the film-forming polymer composition had an about 10% coverage loss. However, the surface lacking the film-forming polymeric composition lost more than 80% of surface coverage.

The performance of film-forming polymeric composition under the heavy rain precipitation, followed by natural snow condition scenario was remarkably better. Specifically, the results showed an about 956% increase in covered surface area for the surface coated with the film-forming polymeric composition compared to the surface lacking a coating of the film-forming polymeric composition.

Example 4

Effect of Light-Traffic and Precipitation on a Dry Surface Coated with a Film-Forming Polymeric Composition This example illustrates the effectiveness of a composition described herein for anti-icing a wet surface in the presence and absence of light vehicular traffic. Specifically, the ability of the composition to adhere an anti-icing composition to dry surfaces was analyzed. The surface comprised 12'×12' square area pavement sections which were marked by painting geometric boundaries and identifying signs onto the pavement. The pavement sections were damp due to a coating of light snow on the pavement from the previous day.

A. The Samples

The control sample was prepared by mixing a 25-26% solution of magnesium chloride (about 9 ounces, i.e., 255 grams) with water (about 2 ounces, i.e., about 56 grams). To this solution was added a color dye (about 1 ounce, i.e., 28 grams, of the Bright Dyes™ reagent) and this final solution was agitated/mixed until and during application to the pavement section.

The test sample was prepared by mixing the Chemshield® formulation (about 0.15 ounces, i.e., 4 grams) with water (about 2 ounces, i.e., about 56 grams), followed by mixing with a color dye (about 1 ounce, i.e., 28 grams, of the Bright Dyes™ reagent). To this solution was added a 25-26% solution of magnesium chloride (about 9 ounces, i.e., 255 grams). This final solution was agitated/mixed until and during application to the pavement sections.

The control and test samples were applied to respective pavement sections using separate handheld sprayers. The sprayers containing the test samples were thoroughly cleaned after each chemical application to avoid contamination. Immediately following application of the control and test samples, heavy surface traffic was simulated using the heavy-duty buses of Example 3. No artificial or natural precipitation conditions were applied or occurring during heavy-traffic period. The heavy surface traffic continued on the pavement sections for 6 hours. A natural heavy snow precipitation began later that day while heavy bus traffic continued.

B. Results

Figure 4:
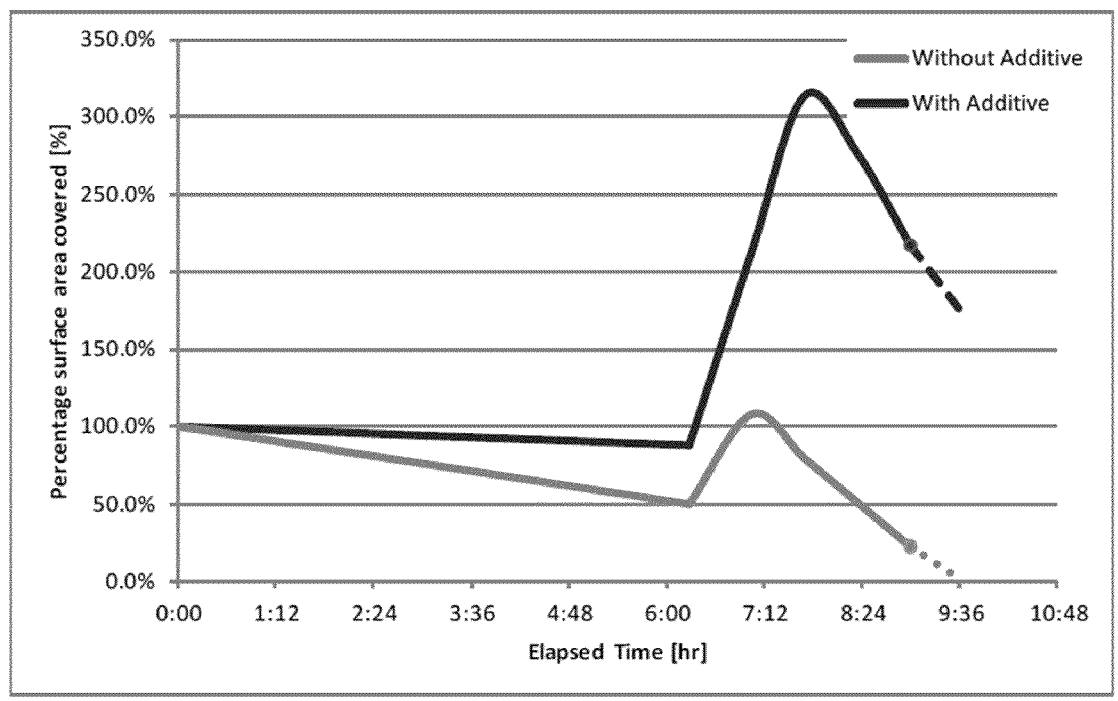
FIG. 4 is graphical illustration of the effect of a method as described here on surface coverage loss of an anti-icing/de-icing composition applied to dry pavement under wet and light-traffic conditions. The graph provides a plot of elapsed time (hour) vs. the percentage (%) of surface area covered. The lines extending from left to right represent surfaces treated with a method as described herein including applying a film-forming polymeric composition with the anti-icing composition vs. the prior art method of applying an anti-icing composition only. The lower line represents surfaces treated with prior art methods of applying an anti-icing composition only. The upper line represents surfaces coated with a method described herein including applying a film-forming polymeric composition with an anti-icing composition. The dotted lines (starting at about t=9 hr) extending from the solid lines are projected performances based on a quadratic projection method.

The data show that the performances of the anti-icing/de-icing composition in the presence and absence of the film-forming polymer were similar to the results of Example 1 and 2 until precipitation and heavy vehicle traffic commenced. However, once traffic started, deterioration of the surface lacking a film-forming polymeric composition coating was markedly faster than the surface containing a film-forming polymeric composition coating. In fact, deterioration continued throughout the following 6 days where different precipitation ranges occurred. The measured surface coverage loss is depicted in FIG. 4.

It is noted that during the 9-hour testing cycle with heavy natural winter precipitation condition, the surface coated with the film-forming polymeric composition had about 220% coverage increase while the surface lacking the coating containing the film-forming polymeric composition lost more than about 75% of surface coverage. Overall, the performance of the film-forming polymeric composition under the heavy natural snow condition showed an about 972% increase in covered surface area compared to the performance of the composition lacking the film-forming polymeric composition.

Example 5

A Comparison of Examples 1-4

The results of Examples 1-4 are summarized in Table 1. In summary, under all conditions, surfaces treated with the film-forming polymeric composition showed significant improvements over surfaces lacking a coating of the film-forming polymeric composition in terms of resistance to wear on the pavement surface. It was also noted that performance improvement increased with weather and precipitation severity. Thus, the performance improvement was magnified by precipitation rate and type. Specifically, while rain increased performance difference to close to 500%, heavy rain, snow, and heavy snow increased the performance difference to close to 1,000% in terms of surface area coverage and resistance to wear.

TABLE 1

| | Retained Surface Coverage by End of the Testing Session | | Performance Difference |
|---|---|---|---|
| | Without Additive (%) | With Additive (%) | Calculated from surface loss values (%) |
| Dry Application without Traffic Testing under Dry Conditions | 86 | 93 | 193 |
| Dry Application without Traffic Testing in Simulated and Natural Low Rain Precipitation | 9 | 82 | 493 |
| Dry Application with Traffic Testing in Simulated Heavy Rain and Winter Precipitation | 19 | 91 | 956 |
| Damp Application with Traffic Testing in Heavy Winter Precipitation | 22 | 217 | 972 * |

All publications cited in this specification are incorporated herein by reference. While the invention has been described with reference to particular embodiments, it will be appreciated that modifications can be made without departing from the spirit of the invention. Such modifications are intended to fall within the scope of the appended claims.

What is claimed is:

1. A method for preventing or delaying formation of ice, snow, or a combination thereof on a surface, said method comprising applying a film-forming polymeric composition comprising a terpene and an anti-icing/de-icing composition to said surface;
wherein said film-forming polymeric composition adheres said anti-icing/de-icing composition to said surface.

2. The method according to claim 1, wherein said anti-icing/de-icing composition comprises a salt comprising sodium chloride, calcium chloride, potassium chloride, magnesium chloride, calcium magnesium acetate, ammonium sulfate, magnesium sulfate, urea, or a combination thereof.

3. The method according to claim 1, wherein said surface is a road and said anti-icing/de-icing composition is applied to said surface at an amount of about 11 to about 500 liters/lane/kilometer.

4. The method according to claim 1, wherein said anti-icing/de-icing composition comprises about 0.005% to about 10% by volume of said film-forming polymeric composition.

5. The method according to claim 1, wherein said surface is a road and said film-forming polymeric composition is applied to said surface at an amount of about 0.30 to about 23 liters/lane/kilometer.

6. The method according to claim 1, wherein said terpene comprises about 10 to about 90% dimer, about 10 to about 50% trimer, 10 to about 50% oligomer, or a combination thereof.

7. The method according to claim 1, wherein the $M_n$ of said terpene is about 250 to about 1000.

8. The method according to claim 1, wherein said film-forming polymeric composition comprises about 10 to about 90% w/w of said terpene.

9. The method according to claim 1, wherein said film-forming polymeric composition further comprises a viscosity modifier, a flexibility enhancer, an emulsification system, or a combination thereof.

10. The method according to claim 9, wherein said flexibility enhancer is a hydrocarbon polymer.

11. The method according to claim 10, wherein said hydrocarbon polymer is polybutene and polyisobutylene.

12. The method according to claim 10, wherein the $M_n$ of said hydrocarbon polymer is about 300 to about 10,000.

13. The method according to claim 9, wherein said film-forming polymeric composition comprises about 1 to about 50% w/w of said flexibility enhancer.

14. The method according to claim 9, wherein said film-forming polymeric composition comprises about 1 to about 15% w/w of said emulsification system.

15. A method for preventing or delaying formation of ice, snow, or a combination thereof on a surface, said method comprising applying a film-forming polymeric composition and an anti-icing/de-icing composition to said surface, wherein said film-forming polymeric composition adheres said anti-icing/de-icing composition to said surface;
wherein the $M_n$ of said film-forming polymeric composition is about 250 to about 1000, the $M_w$ of said film-forming polymeric composition is about 250 to about 1000, and the $M_z$ of said film-forming polymeric composition is about 300 to about 5000.

16. A method for preventing or delaying formation of ice, snow, or a combination thereof on a surface, said method comprising applying a film-forming polymeric composition and an anti-icing/de-icing composition to said surface, wherein said film-forming polymeric composition adheres said anti-icing/de-icing composition to said surface;
wherein the viscosity of said film-forming polymeric composition is about 200 to about 10000 centipoise at 20° C., the density of said film-forming polymeric composition is about 0.85 to about 1.0 grams/milliliter at about 20° C., or a combination thereof.

17. A method for preventing or delaying formation of ice, snow, or a combination thereof on a surface, said method comprising applying a film-forming polymeric composition and an anti-icing/de-icing composition to said surface;
wherein said film-forming polymeric composition adheres said anti-icing/de-icing composition to said surface and comprises:

(i) about 10 to about 90% w/w of a terpene;
(ii) about 10 to about 90% w/w of a viscosity modifier;
(iii) about 1 to about 50% w/w of a flexibility enhancer; and
(iv) about 1 to about 10% w/w of an emulsification system.

18. A method for preventing or delaying formation of ice, snow, or a combination thereof, said method comprising applying a film-forming polymeric composition and an anti-icing/de-icing composition to said surface; wherein said film-forming polymeric composition adheres said anti-icing/de-icing composition to said surface and comprises:
(i) about 65 to about 75% w/w of a terpene;
(ii) about 1 to about 10% w/w of a viscosity modifier;
(iii) about 1 to about 50% w/w of a flexibility enhancer; and
(iv) about 3 to about 10% w/w of an emulsification system.

* * * * *